United States Patent
Ways et al.

(10) Patent No.: US 12,505,100 B1
(45) Date of Patent: Dec. 23, 2025

(54) METHODS FOR ADAPTIVE ROUTING OF DATA RECORDS AND SYSTEMS THEREOF

(71) Applicant: eHealth Technologies, Fairport, NY (US)

(72) Inventors: Sean Ways, Cranberry Township, PA (US); Bhargavi Kanchi, Hyderabad (IN); Erin Wood, Pittsburgh, PA (US); Christopher Temple, Pittsburgh, PA (US)

(73) Assignee: eHealth Global Technologies, Inc., Fairport, NY (US)

( * ) Notice: Subject to any disclaimer, the term of this patent is extended or adjusted under 35 U.S.C. 154(b) by 0 days.

(21) Appl. No.: 19/191,687

(22) Filed: Apr. 28, 2025

Related U.S. Application Data

(63) Continuation of application No. 18/991,926, filed on Dec. 23, 2024, now abandoned.

(51) Int. Cl.
*G06F 16/00* (2019.01)
*G06F 16/2453* (2019.01)
*G06F 16/2455* (2019.01)

(52) U.S. Cl.
CPC .... *G06F 16/2453* (2019.01); *G06F 16/24557* (2019.01)

(58) Field of Classification Search
CPC .................................. G06F 16/24557
See application file for complete search history.

(56) References Cited

U.S. PATENT DOCUMENTS

| | | |
|---|---|---|
| 8,316,237 B1 | 11/2012 | Felsher et al. |
| 11,469,001 B2 | 10/2022 | Takeda |
| 2007/0008927 A1 * | 1/2007 | Herz ............. H04L 45/30 370/331 |
| 2018/0082022 A1 | 3/2018 | Francois |

* cited by examiner

*Primary Examiner* — Ajith Jacob
(74) *Attorney, Agent, or Firm* — Troutman Pepper Locke LLP

(57) ABSTRACT

A method, apparatus, and non-transitory computer readable that receives a request for a data record from a client. Next, a determination is made to identify when there is a difference between: a recommended one of a plurality of collection paths to retrieve the requested data record from one of a plurality of data servers based on the request; and a most efficient one of the collection paths from the one of the data servers based on recorded collection path data. The data record from the identified one of the data servers is retrieved with the most efficient one of the collection paths when the determination identifies the difference. The retrieved data record in response to the request is provided to the requesting client.

15 Claims, 3 Drawing Sheets

METHODS FOR ADAPTIVE ROUTING OF DATA RECORDS AND SYSTEMS THEREOF

This application is a continuation of U.S. patent application Ser. No. 18/991,926, filed Dec. 23, 2024, which is incorporated herein by reference in its entirety.

FIELD

This technology relates to methods, systems and non-transitory computer readable medium for adaptive routing of data records.

BACKGROUND

Typically, the sources and providers from which information is collected are geographically dispersed, utilize a wide range of technologies, with varied technical sophistication, are managed by various levels of staff with varied amounts of expertise. As a result, the retrieval of data records from these different sources and providers is often inefficient and time consuming. Existing records collection process lack executable approaches to optimize the retrieval of these data records and fail to have any mechanism to adapt to changing network environment conditions.

SUMMARY

A method for adaptive routing of data records implemented by a data retrieval management computing system comprising one or more retrieval management computing apparatuses, client devices, or server devices includes receives a request for a data record from a client. Next, a determination is made to identify when there is a difference between: a recommended one of a plurality of collection paths to retrieve the requested data record from one of a plurality of data servers based on the request; and a most efficient one of the collection paths from the one of the data servers based on recorded collection path data. The data record from the identified one of the data servers is retrieved with the most efficient one of the collection paths when the determination identifies the difference. The retrieved data record in response to the request is provided to the requesting client.

A retrieval management computing apparatus, comprising memory comprising programmed instructions stored thereon and one or more processors configured to be capable of executing the stored programmed instructions to receive a request for a data record from a client. Next, a determination is made to identify when there is a difference between: a recommended one of a plurality of collection paths to retrieve the requested data record from one of a plurality of data servers based on the request; and a most efficient one of the collection paths from the one of the data servers based on recorded collection path data. The data record from the identified one of the data servers is retrieved with the most efficient one of the collection paths when the determination identifies the difference. The retrieved data record in response to the request is provided to the requesting client.

A non-transitory computer readable medium having stored thereon instructions for improving natural language processing with enhanced automated screening for automated generation of a clinical summarization report comprising executable code which when executed by one or more processors, causes the one or more processors to receive a request for a data record from a client. Next, a determination is made to identify when there is a difference between: a recommended one of a plurality of collection paths to retrieve the requested data record from one of a plurality of data servers based on the request; and a most efficient one of the collection paths from the one of the data servers based on recorded collection path data. The data record from the identified one of the data servers is retrieved with the most efficient one of the collection paths when the determination identifies the difference. The retrieved data record in response to the request is provided to the requesting client.

This technology provides a number of advantages including providing methods, non-transitory computer readable media, and devices for optimizing adaptive routing of data records. Examples of this technology are configured to optimize this automated medical records collection process by recognizing providers and retrieving medical records in the most optimal way possible. Additionally examples of this technology are able to dynamically adapt to any changes in collection paths to further optimize data record retrieval.

DETAILED DESCRIPTION

Figure 1:
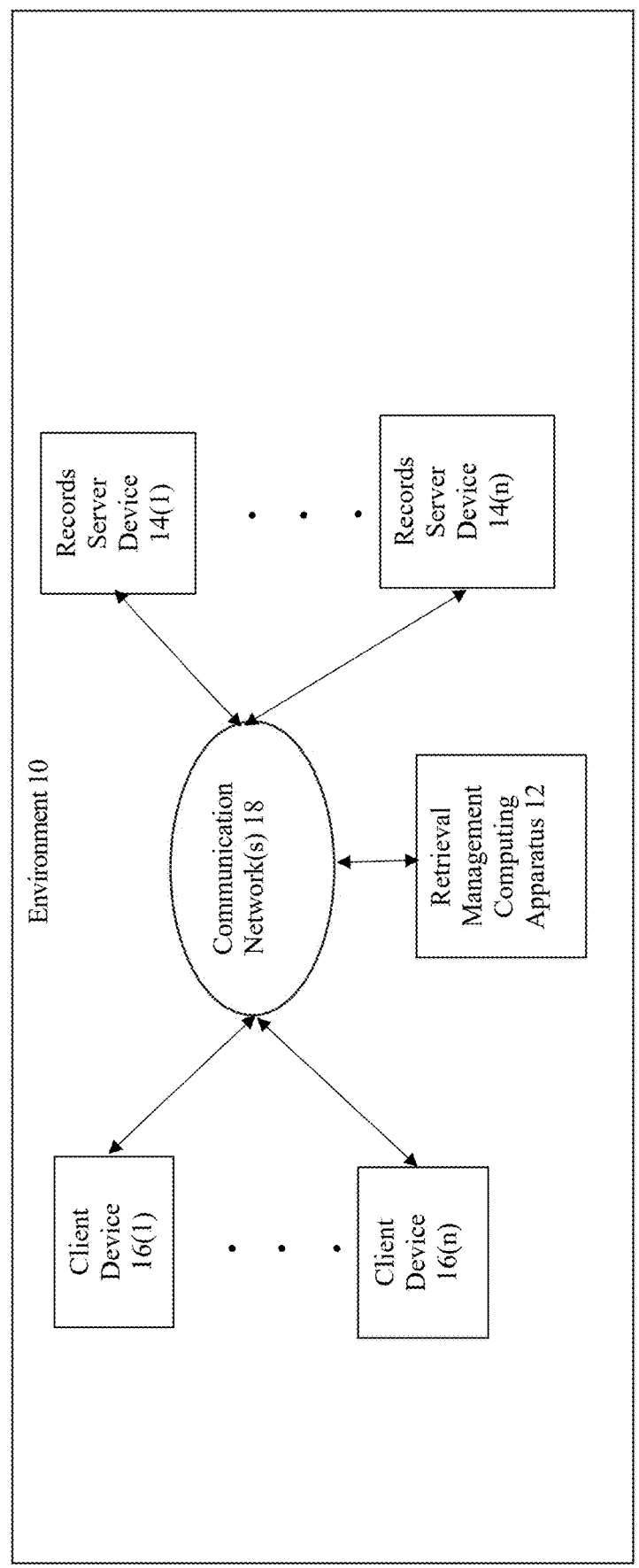
FIG. 1 is a diagram of a network environment with an example of a retrieval management computing apparatus.

Referring to FIG. 1, an exemplary network environment 10 which incorporates an exemplary retrieval management computing apparatus 12 is illustrated. In this particular example, the retrieval management computing apparatus 12 is coupled to a plurality of records server devices 14(1)-14(n) and a plurality of client devices 16(1)-16(n) via communication network(s) 18, although the retrieval management computing apparatus 12, records server devices 14(1)-14(n), and/or client devices 16(1)-16(n) may be coupled together via other topologies. Additionally, the retrieval management computing apparatus 12 may include other network devices such as one or more routers and/or switches, for example, which are well known in the art and thus will not be described herein. This technology provides a number of advantages including methods, non-transitory computer readable media, and retrieval management computing apparatuses that optimize adaptive routing of data records.

Figure 2:
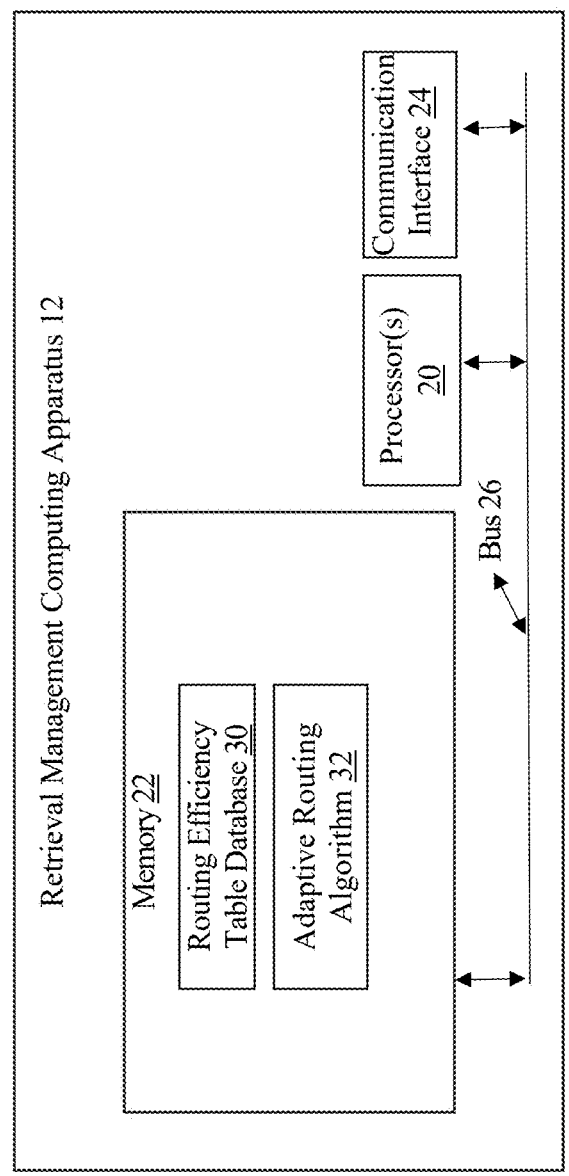
FIG. 2 is a block diagram of an example of the retrieval management computing apparatus.

Referring to FIGS. 1-2, the retrieval management computing apparatus 12 may perform any number of functions including that optimize adaptive routing of data records. The retrieval management computing apparatus 12 includes one or more processors 20, a memory 22, and/or a communication interface 24, which are coupled together by a bus or other communication link 26, although the retrieval management computing apparatus 12 can include other types and/or numbers of elements in other configurations.

The processor(s) 20 of the retrieval management computing apparatus 12 may execute programmed instructions stored in the memory 22 of the retrieval management computing apparatus 12 for the any number of the functions illustrated and described by way of the examples herein. The processor(s) 20 of the retrieval management computing apparatus 12 may include one or more CPUs or general purpose processors with one or more processing cores, for example, although other types of processor(s) can also be used.

The memory 22 of the retrieval management computing apparatus 12 stores these programmed instructions for one or more aspects of the present technology as described and illustrated by way of the examples herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 22.

Figure 3:
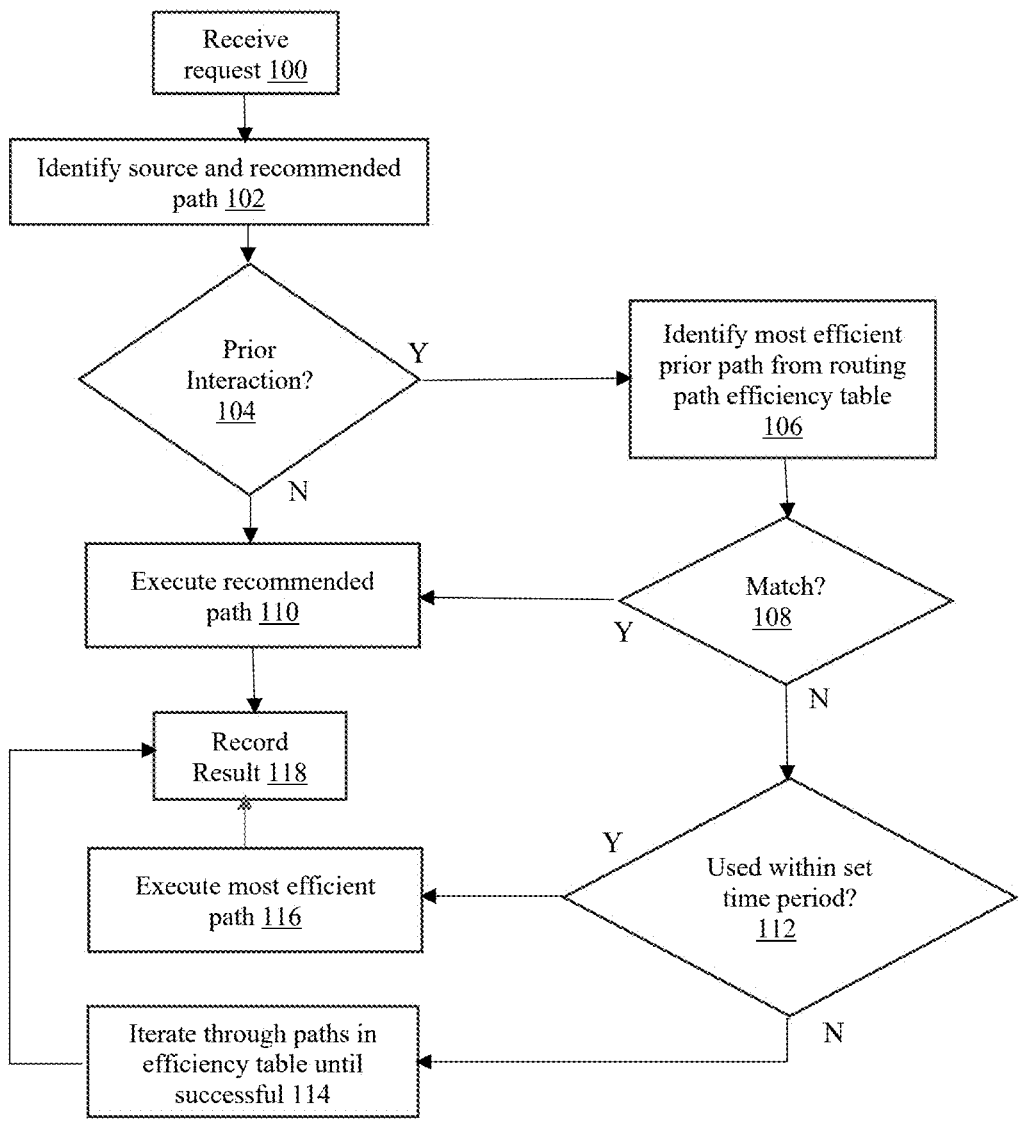
FIG. 3 is a flow chart of an example of a method for adaptive routing of data records.

Accordingly, the memory 22 of the retrieval management computing apparatus 12 can store one or more applications that can include computer executable instructions that, when executed by the retrieval management computing apparatus 12, cause the retrieval management computing apparatus 12 to perform actions, such as to perform actions as described and illustrated in the examples below with reference to FIG. 3. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the retrieval management computing apparatus 12 itself, may be located in virtual server(s) running in a cloud-based computing environment rather than being tied to one or more specific physical network computing devices. Also, the application(s) may be running in one or more virtual machines (VMs) executing on the retrieval management computing apparatus 12. Additionally, in one or more embodiments of this technology, virtual machine(s) running on the retrieval management computing apparatus 12 may be managed or supervised by a hypervisor.

In this particular example, the memory 22 of the retrieval management computing apparatus 12 includes a routing efficiency table database 30 and an adaptive routing algorithm 32, although the memory can include other types and/or numbers of other policies, modules, databases, or applications, for example. The routing efficiency table database 30 may include tables for one or more of the records server devices 14(1)-14(n) comprising collection paths and recorded collection efficiencies, successes, and collection effort timestamps, although the tables and/or database may record, process and store other types of data. The adaptive routing algorithm 32 is a software program that optimizes adaptive routing of data records as illustrated and described by way of the examples herein, although other types and/or numbers of record processing algorithms could be used. By way of example, the adaptive routing algorithm 32 can for example monitor and analyze efficiency of collection paths, develop and manage routing tables, record timestamps and manage execution based on defined time periods, and iterate through execution of collection paths and determine success, although the adaptive routing algorithm 32 can execute other types and/or numbers of other functions and/or operations, such as other executable instructions necessary for managing data record retrieval.

The communication interface 24 of the retrieval management computing apparatus 12 operatively couples and communicates between the retrieval management computing apparatus 12, the records server devices 14(1)-14(n), and/or the client devices 16(1)-16(n), which are all coupled together by the communication network(s) 18, although other types and/or numbers of communication networks or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) in this example can employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like. The communication network(s) 18 can also include one or more direct connection(s) (e.g., for when a device illustrated in FIG. 1, such as the retrieval management computing apparatus 12, one or more of the client devices 16(1)-16(n), or one or more of the records server devices 14(1)-14(n) operate as virtual instances on the same physical machine).

While the retrieval management computing apparatus 12 is illustrated in this example as including a single device, the retrieval management computing apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the retrieval management computing apparatus 12.

Additionally, one or more of the devices that together comprise the retrieval management computing apparatus 12 in other examples can be standalone devices or integrated with one or more other devices or apparatuses, such as one of the records server devices 14(1)-14(n) or one of the client devices 16(1)-16(n), for example. Moreover, one or more of the devices of the retrieval management computing apparatus 12 in these examples can be in a same or a different communication network including one or more public, private, or cloud networks, for example.

Each of the records server devices 14(1)-14(n) in this example includes one or more processors, a memory, and a communication interface, which are coupled together by a bus or other communication link, although other numbers and/or types of network devices could be used. The records server devices 14(1)-14(n) in this example process requests from one or more client devices 16(1)-16(n) managed by the retrieval management computing apparatus 12 via the communication network(s) 18. Various applications may be operating on and various types and/or amounts of data may be stored on the records server devices 14(1)-14(n) which can be retrieved and transmitted to the client devices 16(1)-16(n) via one of a plurality of collection paths managed by the retrieval management computing apparatus 12 in response to requests from the client devices 16(1)-16(n). The records server devices 14(1)-14(n) may be hardware or software or may represent a system with multiple servers in a pool, which may include internal or external networks. Although one set of record server devices 14(1)-14(n) are shown in the example here for ease of illustration, examples of this technology can operate with multiple different sets and types of record data servers or other systems which can be associated with a variety of different entities.

Although the records server devices 14(1)-14(n) are illustrated as single devices, one or more actions of each of the records server devices 14(1)-14(n) may be distributed across one or more distinct network computing devices that together comprise one or more of the records server devices 14(1)-14(n) for one or more different entities. Moreover, the records server devices 14(1)-14(n) are not limited to a particular configuration and may be associated with a variety of different entities. Thus, the records server devices 14(1)-14(n) may contain a plurality of network computing devices that operate using a master/slave approach, whereby one of the network computing devices of the records server devices 14(1)-14(n) operate to manage and/or otherwise coordinate operations of the other network computing devices. The records server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the records server devices 14(1)-14(n) could operate within the retrieval management computing apparatus 12, itself rather than as a stand-alone server device communicating with the retrieval management computing apparatus 12 via the communication network(s).

The client devices 16(1)-16(n) in this example include any type of computing device, such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and/or types of network devices could be used.

The client devices 16(1)-16(n) may run interface applications, such as standard Web browsers or standalone client applications, which may provide an interface to make requests for and receive content, such as medical records, stored on one or more of the records server devices 14(1)-14(n) via the communication network(s) 18. The client devices 16(1)-16(n) may further include a display device, such as a display screen or touchscreen, and/or an input device, such as a keyboard for example.

Although the exemplary retrieval management computing apparatus 12, records server devices 14(1)-14(n), client devices 16(1)-16(n), and communication network(s) 18 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the retrieval management computing apparatus 12, records server devices 14(1)-14(n), or client devices 16(1)-16(n), for example, may be configured to operate as virtual instances on the same physical machine. In other words, one or more of the retrieval management computing apparatus 12, records server devices 14(1)-14(n), or client devices 16(1)-16(n) may operate on the same physical device rather than as separate devices communicating through communication network(s). Additionally, there may be more or fewer of the retrieval management computing apparatus 12, records server devices 14(1)-14(n), or client devices 16(1)-16(n) than illustrated in FIG. 1. The client devices 16(1)-16(n) could also be implemented as applications on the retrieval management computing apparatus 12, itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method for adaptive routing of data records will now be described with reference to FIGS. 1-3. Referring more specifically to FIG. 3, in step 100 in this example the retrieval management computing apparatus 12 receive and begin executing the adaptive routing algorithm 32 to manage a request for data record, such as a patient medical record by way of example only, from one of the client devices 16(1)-16(n) and stored at one of the record server devices 14(1)-14(n).

In step 102, the retrieval management computing apparatus 12 can identify the one or more records server devices 14(1)-14(n) which store the requested data record based, for example, on the destination address in the request along with a recommended one of a plurality collection paths obtained from the request, although other manners for identifying or otherwise determining the one or more records server devices 14(1)-14(n) storing the requested date record can be used.

In step 104, the retrieval management computing apparatus 12 determines if there has been any prior interaction with the one or more records server devices 14(1)-14(n) identified as storing the requested date record. If in step 104, the retrieval management computing apparatus 12 determines there has not been any prior interaction with the one or more records server devices 14(1)-14(n) identified as storing the requested date record, then the No branch is taken to step 110.

In step 110, the retrieval management computing apparatus 12 initiates the retrieval of the requested data record from the identified one or more records server devices 14(1)-14(n) executing retrieval based on the recommended one of the plurality collection paths and provides the requested data record to the requesting one of the client devices 16(1)-16(n). Next, the retrieval management computing apparatus 12 proceeds to step 118.

In step 118, the retrieval management computing apparatus 12 captures and records the result which includes the captured timestamp for when the retrieval occurred along with other data, such as the amount of time needed for retrieval, a size of the data record being retrieved (e.g. different collection paths may be more efficient based on characteristics of the data record, such as the size of the data record), and/or a success or error retrieval rate by way of example only, in a maintained routing table associated with the identified one or more records server devices 14(1)-14(n).

As discussed in the example below, if the maintained routing table associated with the identified one or more records server devices 14(1)-14(n) has recorded retrievals by more than one of the collection paths, then the retrieval management computing apparatus 12 can analyze and determine an efficiency of retrieval from the identified one or more records server devices 14(1)-14(n) based on one or more criteria, such as amount of time needed for retrieval, a type of data record being retrieved, (such as requested data record that is a JPG or other image file type, a PDF file type, or a Word document file type by way of example), a size of the data record being retrieved, and/or a prior recorded success or error retrieval rate by way of example only. The retrieval management computing apparatus 12 can analyze and determine the efficiency of the retrieval from the identified one or more records server devices 14(1)-14(n) based on one or more this recorded criteria for the collection paths from the identified one or more records server devices 14(1)-14(n) in a number of different manners. For example, the analysis and determination of the efficiency of the retrieval via different collection paths from the identified one or more records server devices 14(1)-14(n) by the retrieval management computing apparatus 12 may be based on solely on one of the recorded retrieval time data, the identified type of data record being retrieved, the identified size of the data record being retrieved, or a prior record success or error retrieval rate for data records by that collection path by way of example. In other examples, this analysis and determination of the efficiency of the retrieval via different collection paths from the identified one or more records server devices 14(1)-14(n) by the retrieval management computing apparatus 12 may be based on a combination of these and/or other criteria and/or may include different weighted percentages assigned to different criteria, such as weighing more recently captured criteria with a higher weighted percentage than other criteria captured after a particular set time or time period from the current time. In a further example, the retrieval management computing apparatus 12 may have missing data for one or more of the criteria for one or more of the collection paths and then may utilize stored default data, such as a stored default data, prior historical data for that collection path, or an average of the other related data for that criteria for other collection paths which is available by way of example. In another example, the retrieval management computing apparatus 12 may also take into account the availability of each of the collection paths based on the particular time of day and historical recorded usage during those different times of day or of the current operational status of each of the collection paths or of the recorded reliability of each of the collection paths when determining the efficiency of the collection paths. Each subsequent request from the records server devices 14(1)-14(n) is recorded and aggregated to inform the retrieval management computing apparatus 12 to perform a deterministic retrieval of records using the fastest possible route.

Based on the analysis the retrieval management computing apparatus 12 can determine an order from most to least efficient for each of the collection paths in the maintained routing table associated with the identified one or more records server devices 14(1)-14(n), although other types of orders can be generated. By way of example only, an example of a stored routing table collection paths for retrieval of medical records (most efficient to least efficient) along with a recorded timestamp of the last retrieval via that collection path (which can include the time) of the last retrieval with that collection path is illustrated below:

| Routing Table: |
| --- |
| Automated-Direct provider API-Jul. 6, 2024 |
| Automated-National Network (Carequality, Commonwell, HIE)-Jun. 13, 2024 |
| Automated-Release of Information (ROI) vendor API-May 19, 2024 |
| Automated-Provider portal automation-May 20, 2024 |
| Manual-ROI request portal-Dec. 16, 2023 |
| Manual-Phone call & fax-Dec. 17, 2023 |

As illustrated in the example above, the "Automated—Direct provider API" collection is the most efficient and the "Manual—Phone call & fax" collection path is the least efficient. Additionally, each collection path in this example lists the type of collection path and also the date when utilized. The stored routing table may include other recorded data that was used in determining efficiency, such as an amount of time needed for retrieval, a size of the data record being retrieved and/or a success or error retrieval rate by way of example, although other types and/or amounts of other data or other criteria could be captured and utilized.

If back in step 104, the retrieval management computing apparatus 12 determines there has been prior interaction with the one or more records server devices 14(1)-14(n) identified as storing the requested date record, then the Yes branch is taken to step 106. In step 106, the retrieval management computing apparatus 12 identifies the maintained routing table associated with the identified one or more records server devices 14(1)-14(n). Based on that identified routing table, the retrieval management computing apparatus 12 obtains the current most efficient collection path for retrieving the requested data record from the identified one or more records server devices 14(1)-14(n).

In step 108, the retrieval management computing apparatus 12 determines if the most efficient collection path matches the recommended one of the plurality collection paths. If in step 108, the retrieval management computing apparatus 12 determines the most efficient collection path matches the recommended one of the plurality collection paths, then the Yes branch is taken to step 110 as described earlier.

If in step 108, the retrieval management computing apparatus 12 determines the most efficient collection path does not match the recommended one of the plurality collection paths, then the No branch is taken to step 112. In step 112, the retrieval management computing apparatus 12 determines if the most efficient collection path for retrieving the requested data record from the identified one or more records server devices 14(1)-14(n) has been used within a set prior time period. In this example, the set time period used by the retrieval management computing apparatus 12 is ninety days, although other time periods could be used.

If in step 112, the retrieval management computing apparatus 12 determines the most efficient collection path for retrieving the requested data record from the identified one or more records server devices 14(1)-14(n) has been used within a set prior time period, then the Yes branch is taken to step 116. For example, in the routing table illustrated herein, the most efficient collection path, "Automated—Direct provider API" was used back on Jul. 6, 2024, within the ninety day time period.

In step 116, the retrieval management computing apparatus 12 initiates the retrieval of the requested data record from the identified one or more records server devices 14(1)-14(n) executing retrieval based on the most efficient one of the plurality collection paths and provides the requested data record to the requesting one of the client devices 16(1)-16(n). Next, the retrieval management computing apparatus 12 proceeds to step 118 as described earlier.

If in step 112, the retrieval management computing apparatus 12 determines the most efficient collection path for retrieving the requested data record from the identified one or more records server devices 14(1)-14(n) has not been used within the set prior time period, then the No branch is taken to step 114. In step 114, the retrieval management computing apparatus 12 iterates through attempting to retrieve the requested data record from the identified one or more records server devices 14(1)-14(n) via the collection paths in the routing table, such as the one illustrated, from next most efficient to least efficient until the requested data record is retrieved and provided to the requesting one of the client devices 16(1)-16(n). Next, the retrieval management computing apparatus 12 proceeds to step 118 as described earlier. In step 118, the retrieval management computing apparatus 12 may also update the routing table as needed based on the monitored results of the iterative retrieval process.

Accordingly, as illustrated and described by way of the examples herein, this technology provides methods, non-transitory computer readable media, and devices for optimizing adaptive routing of data records. Examples of this technology relate to a unique way of collecting medical records for patients from disparate sources and providers at speed. The sources and providers from which information is collected are often geographically dispersed, utilize a wide range of technologies, with varied technical sophistication, are managed by varied staff expertise and staffing levels. Examples of this technology also are configured to optimize this automated records collection process by recognizing providers and retrieving records in the most optimal way possible.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method for implemented by a retrieval management computing system comprising one or more retrieval management computing apparatuses, client devices, or server devices, the method comprising:
   receiving a request for a data record stored at one of a plurality of data servers from a client computing device;
   executing an adaptive routing algorithm based on a routing table comprising recorded collection efficiency rates, success rates, and collection effort timestamps for a plurality of network collection paths to ones of a plurality of type and a plurality of sizes of prior data records corresponding to the requested data record to determine when there is a difference between: a recommended one of a plurality of network communication collection paths to retrieve the requested data record from the one of the data servers obtained from the request; and a most efficient one of the network communication collection paths from the one of the data servers based on recorded network communication collection path data; and
   retrieving the data record from the identified one of the data servers with the most efficient one of the network communication collection paths when the determination based on the executed adaptive routing algorithm identifies the difference; and
   providing in response to the request the retrieved data record to the requesting client computing device.

2. The method as set forth in claim 1 further comprising:
   determining whether the most efficient one of the network communication collection paths from the one of the data servers has been used within a set time period;
   wherein the retrieving the data record is further based on when the determination indicates the most efficient one of the network communication collection paths from the one of the data servers has been used within the set time period.

3. The method as set forth in claim 2 further comprising:
   iterating, based on recorded prior efficiency, through the network communication collection paths to retrieve the data record until the data record is successfully retrieved when the determination indicates the most efficient one of the network communication collection paths from the one of the data servers falls outside of the set time period.

4. The method as set forth in claim 1 further comprising:
   maintaining the routing table of the recorded network communication collection path data to one or more of the data servers, wherein the retrieving the data record from the identified one of the data servers with the most efficient one of the network communication collection paths is based on a corresponding one of the maintained routing tables.

5. The method as set forth in claim 1 wherein the recommended one of the plurality of network communication collection paths and the most efficient one of the network communication collection paths match.

6. A retrieval management computing apparatus, comprising memory comprising programmed instructions stored thereon and one or more processors configured to be capable of executing the stored programmed instructions to:
   receive a request for a data record stored at one of a plurality of data servers from a client computing device;
   executing an adaptive routing algorithm based on a routing table comprising recorded collection efficiency rates, success rates, and collection effort timestamps for a plurality of network collection paths to ones of a plurality of type and a plurality of sizes of prior data records corresponding to the requested data record to determine when there is a difference between: a recommended one of a plurality of network communication collection paths to retrieve the requested data record from the one of the data servers obtained from the request; and a most efficient one of the network communication collection paths from the one of the data servers based on recorded network communication collection path data; and retrieve the data record from the identified one of the data servers with the most efficient one of the network communication collection paths when the determination based on the executed adaptive routing algorithm identifies the difference; and provide in response to the request the retrieved data record to the requesting client computing device.

7. The apparatus as set forth in claim 6 wherein the one or more processors are further configured to be capable of executing the stored programmed instructions to:

determine whether the most efficient one of the network communication collection paths from the one of the data servers has been used within a set time period;

wherein the retrieving the data record is further based on when the determination indicates the most efficient one of the network communication collection paths from the one of the data servers has been used within the set time period.

8. The apparatus as set forth in claim 7 wherein the one or more processors are further configured to be capable of executing the stored programmed instructions to:

iterate, based on recorded prior efficiency, through the network communication collection paths to retrieve the data record until the data record is successfully retrieved when the determination indicates the most efficient one of the network communication collection paths from the one of the data servers falls outside of the set time period.

9. The apparatus as set forth in claim 6 wherein the one or more processors are further configured to be capable of executing the stored programmed instructions to:

maintaining the routing table of the recorded network communication collection path data to one or more of the data servers, wherein the retrieving the data record from the identified one of the data servers with the most efficient one of the network communication collection paths is based on a corresponding one of the maintained routing tables.

10. The method as set forth in claim 1 wherein the recommended one of the plurality of network communication collection paths and the most efficient one of the network communication collection paths match.

11. A non-transitory computer readable medium having stored thereon instructions improving natural language processing with enhanced automated screening for automated generation of a clinical summarization report comprising executable code which when executed by one or more processors, causes the one or more processors to:

receive a request for a data record stored at one of a plurality of data servers from a client computing device;

executing an adaptive routing algorithm based on a routing table comprising recorded collection efficiency rates, success rates, and collection effort timestamps for a plurality of network collection paths to ones of a plurality of type and a plurality of sizes of prior data records corresponding to the requested data record to determine when there is a difference between: a recommended one of a plurality of network communication collection paths to retrieve the requested data record the one of the data servers obtained from the request; and a most efficient one of the network communication collection paths from the one of the data servers based on recorded network communication collection path data; and retrieve the data record from the identified one of the data servers with the most efficient one of the network communication collection paths when the determination based on the executed adaptive routing algorithm identifies the difference; and provide in response to the request the retrieved data record to the requesting client computing device.

12. The non-transitory computer readable medium as set forth in claim 11 wherein the executable code when executed by the one or more processors further causes the one or more processors to:

determine whether the most efficient one of the network communication collection paths from the one of the data servers has been used within a set time period;

wherein the retrieving the data record is further based on when the determination indicates the most efficient one of the network communication collection paths from the one of the data servers has been used within the set time period.

13. The non-transitory computer readable medium as set forth in claim 12 wherein the executable code when executed by the one or more processors further causes the one or more processors to:

iterate, based on recorded prior efficiency, through the network communication collection paths to retrieve the data record until the data record is successfully retrieved when the determination indicates the most efficient one of the network communication collection paths from the one of the data servers falls outside of the set time period.

14. The non-transitory computer readable medium as set forth in claim 11 wherein the executable code when executed by the one or more processors further causes the one or more processors to:

maintaining the routing table of the recorded network communication collection path data to one or more of the data servers, wherein the retrieving the data record from the identified one of the data servers with the most efficient one of the network communication collection paths is based on a corresponding one of the maintained routing tables.

15. The non-transitory computer readable medium as set forth in claim 11 wherein the recommended one of the plurality of network communication collection paths and the most efficient one of the network communication collection paths match.

\* \* \* \* \*